US012670054B1

(12) United States Patent (10) Patent No.: US 12,670,054 B1

Molchany et al. (45) Date of Patent: Jun. 30, 2026

(54) GROUP-BASED EVENT ANALYSIS SERVICE

(71) Applicant: Amazon Technologies, Inc., Seattle, WA (US)

(72) Inventors: Gregory Stephen Molchany, Columbia, MD (US); Karl Eric Anderson, Columbia, MD (US); Patrick William Dowd, Annapolis, MD (US)

(73) Assignee: Amazon Technologies, Inc., Seattle, WA (US)

( * ) Notice: Subject to any disclaimer, the term of this patent is extended or adjusted under 35 U.S.C. 154(b) by 158 days.

(21) Appl. No.: 18/614,495

(22) Filed: Mar. 22, 2024

(51) Int. Cl.
*G06F 21/00* (2013.01)
*G06F 11/07* (2006.01)

(52) U.S. Cl.
CPC ................................. *G06F 11/0772* (2013.01)

(58) Field of Classification Search
None
See application file for complete search history.

(56) References Cited

U.S. PATENT DOCUMENTS

| | | | |
|---|---|---|---|
| 7,231,206 | B2 | 6/2007 | Cudak |
| 8,190,640 | B2 | 5/2012 | Mincarelli |
| 9,225,730 | B1 * | 12/2015 | Brezinski ................. G06F 21/00 |
| 10,346,772 | B2 | 7/2019 | Mahmud |
| 10,366,101 | B2 * | 7/2019 | Ching ..................... G06F 16/26 |
| 10,521,584 | B1 * | 12/2019 | Sharifi Mehr ...... H04L 63/1433 |
| 10,547,623 | B1 | 1/2020 | Han |
| 10,706,079 | B2 | 7/2020 | Kassa |
| 10,841,281 | B2 * | 11/2020 | Chiang ............... H04L 63/1433 |
| 2007/0150585 | A1 * | 6/2007 | Chkodrov ......... G06F 16/24556 |
| | | | 709/224 |
| 2008/0083034 | A1 * | 4/2008 | Kim ..................... H04L 63/1433 |
| | | | 726/25 |
| 2013/0151695 | A1 * | 6/2013 | Bleakley ................ G06Q 30/00 |
| | | | 709/224 |
| 2015/0180894 | A1 * | 6/2015 | Sadovsky ............. H04W 12/12 |
| | | | 726/22 |
| 2016/0080406 | A1 * | 3/2016 | Sadovsky ........... H04L 63/1408 |
| | | | 726/23 |
| 2022/0417277 | A1 * | 12/2022 | Ben-Noon .............. H04L 67/55 |
| 2023/0093540 | A1 * | 3/2023 | Karl .................... H04L 63/1425 |
| | | | 726/23 |
| 2023/0231871 | A1 * | 7/2023 | Jiao ......................... G06N 3/098 |
| | | | 726/23 |

OTHER PUBLICATIONS

U.S. Appl. No. 17/936,787, filed Sep. 29, 2022, Karl Eric Anderson, et al.

U.S. Appl. No. 18/538,929, filed Dec. 13, 2023, Karl Eric Anderson, et al.

* cited by examiner

*Primary Examiner* — Maung T Lwin

(74) *Attorney, Agent, or Firm* — Alexander A. Knapp; Kowert, Hood, Munyon, Rankin & Goetzel, P.C.

(57) ABSTRACT

A group-based event analysis service may be implemented by a provider network to monitor service-to-service event streams to identify behavior that is abnormal for a particular group of event streams. Event streams may be classified into groups based on the computing resources or services that generate the events, the behavior patterns of the events in the event stream, and other information about the event streams. Deviations in behavior of individual members of a group relative to group behavior may be used to identify anomalous and/or potentially harmful behavior.

20 Claims, 11 Drawing Sheets

GROUP-BASED EVENT ANALYSIS SERVICE

BACKGROUND

Cloud service providers may offer multiple services that are able to communicate with each other and which also interact with customers. Such cloud service providers may utilize various threat detection systems to identify potentially malicious activities directed at the cloud service providers. For example, traffic originated by customers and entities outside of the cloud service provider may be monitored for malicious activities, such as malefactors coordinating in distributed denial of service attacks or impersonating customers.

Such cloud service provider networks may also carry a large amount of service-to-service traffic. For example, internal service traffic may coordinate autoscaling, service updates, service management, etc. However, such internal communications may be considered trusted and may not be monitored in a similar manner as customer traffic or other traffic originating outside of the cloud service provider network.

Figure 1:
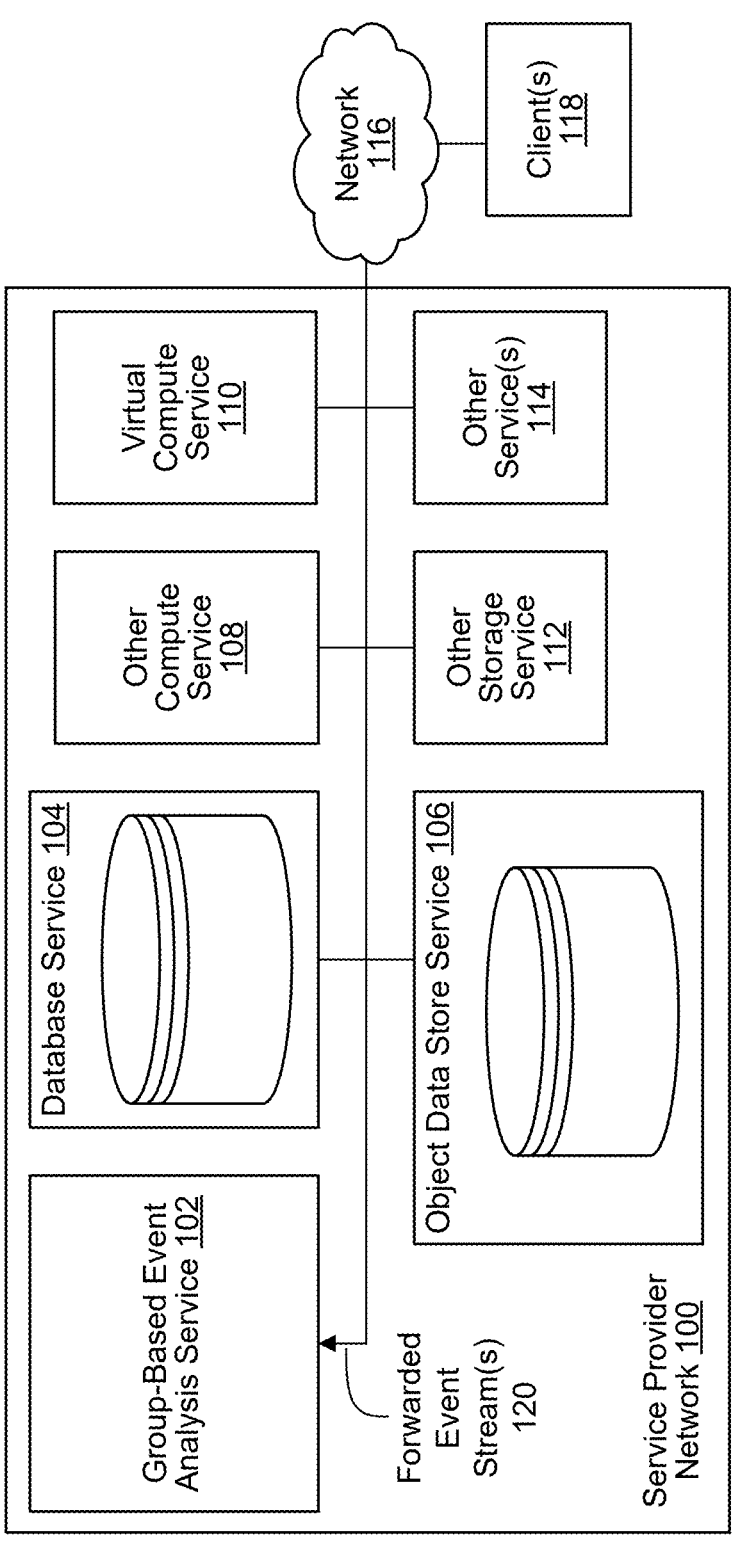
FIG. 1 is a block diagram illustrating a service provider network with a group-based event analysis service, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

A service provider network may implement a group-based event analysis service to monitor service-to-service event streams within the service provider network. Service-to-service event streams may include traffic between resources managed by a given service as well as traffic between services. However, it should be noted that service-to-service event streams may be distinct from service-to-customer event streams. For example, service-to-service event streams may be originated by processes executing code that is inaccessible to customers. For example, internal code used to manage a service or to coordinate interactions between services may generate events that are included in the service-to-service event streams. The group-based event analysis service may group event streams or portions of event streams, such as event flows or individual events of such service-to-service event streams, into groupings based on similarity. Similarity of event streams or portions of event streams may include similarity of behavior patterns across attributes of the event streams or portions of event streams, such as ownership or management, communication targets, and amount of communication. The group-based event analysis service may then monitor the event streams for activity that is abnormal to a group. The group-based event analysis service may take automatic steps to mitigate abnormal activity, for example by terminating one or more processes originating the anomalous event stream or portion of an event stream. Additionally, the group-based event analysis service may coordinate the collection of forensic data, such as a snapshot of a state of computing resource originating the anomalous activity prior to (or at the time of) terminating the one or more processes responsible for the anomalous activity.

A group-based event analysis service may enhance security in large scale computing environments by comparing activity within groups of related event streams or portions of event streams. For example, a single processor included in a computing-based service may begin sending messages to a particular system. In isolation, the event flow of the processor sending a set of messages to the particular system may not appear to be anomalous activity, and there may be many similar messages sent to the particular system from processors across the service provider network. A naïve approach, such as a non-group-based analysis technique, may use excessive computing resources by individually scrutinizing each message to determine whether the message is a result of activity that is considered harmful, or may otherwise ignore potentially activity that is considered harmful, for example due to a large amount of similar benign activity. In contrast, a group-based event analysis service, as described herein, may compare an event flow originating from the single processor to a group of event flows that have been determined to be similar to the event flow originating from the single processor and may determine that the event flow of sending messages to the particular system is anomalous within the grouping. In this way, the group-based event analysis service avoids the high-overhead tasks of individually scrutinizing each message, and instead can detect anomalous behavior by evaluating variations in behavior of group members that have been grouped together, wherein the anomalous behavior is identified based on an individual member of the group's behavior deviating from the behavior of other group members. In this way, the group-based event analysis service may efficiently use computing resources by analyzing whether anomalous activity for a particular group of event streams or event stream portions is considered harmful.

In some embodiments, the items being grouped may include events, event flows, and event streams originating from internal components of a cloud service provider network, such as communications originating at computing hosts of the cloud service provider network, control plane commands being communicated to the computing hosts, internal network controllers, etc. A group-based event analysis service may determine groups of event streams or event stream portions based on attributes of the event streams. Attributes may include information about the event streams, for example, a particular type of communication between a first type of component and a second type of component may be labeled as a given particular type of communication, and this label may be an attribute. Other attributes may be information such as an originating IP address, a destination IP address, an amount of traffic, and other information about the events which make up the event stream or event flow. An event stream between two services of a service provider network may be composed of an event flow or a plurality of event flows. An event flow may be a series of events with a common origin, which may be regularly occurring events.

A group-based event analysis service may group event streams or portions of event streams based on the attributes of the event streams or portions of the event streams. Event streams generated based on a same code base may be likely to have similar attributes. Some particular service-to-service event streams have similar attributes to other particular service-to-service event streams due to the particular service-to-service event streams having a similar purpose or similar logical architecture. The group-based event analysis service may group event streams that have similar attributes together. For example, a fleet of computing hosts of a given service may share a common code base and may be expected to generate similar activity in response to similar circumstances. Thus, a given host of the fleet exhibiting activity that deviates from the activity generated by the other computing hosts of the fleet may indicate a potential security issue, such as activity that is considered harmful.

In some embodiments, a group-based event analysis service may generate a multi-dimensional vector corresponding to an event stream or a portion of an event stream based on attributes of the event stream or portions of the event stream. A dimension of a multi-dimensional vector may correspond to an attribute of an event stream or may correspond to an attribute of a portion of an event stream. Such multi-dimensional vectors may be used to both determine groupings and also to identify anomalous behavior, by deviations in behavior of a group member relative to other members of the group. For example, the group-based event analysis service may group the event streams using statistical techniques based on the multi-dimensional vectors, which may identify statistical similarities between attributes of the event streams or attributes of portions of the event streams. In some embodiments, the group-based event analysis service may use an unsupervised machine learning model to generate the multi-dimensional vectors corresponding to the event streams or portions of event streams. The group-based event analysis service may also use an unsupervised machine learning model to group the event streams or portions of the event streams based on the multi-dimensional vectors. In some embodiments, the group-based event analysis service may use one or more unsupervised machine learning models to generate the multi-dimensional vectors corresponding to the event streams and another unsupervised machine learning model to group the event streams based on the multi-dimensional vectors.

Additionally, the group-based event analysis service may update the multi-dimensional vectors corresponding to the event streams with changed attributes of the event streams or with changed attributes of the portions of the event streams. For example, if the nature of communications changes, new attributes and corresponding new vector dimensions may be determined. Also, even without determining new attributes and new vector dimensions, a given event flow or event stream's classification of having a given attribute and the magnitude of a corresponding vector dimension for that attribute may be updated.

The group-based event analysis service may identify group-anomalous activity in an event stream or a portion of an event stream based on changes in magnitude of vector dimensions of the multi-dimensional vector of a particular event stream or a particular portion of an event stream, where the change in magnitude deviates from the group to which the particular event stream or the particular portion of the event stream belongs. Note that such deviations may be determined multi-dimensionally. For example, deviations may be determined based on a combination of changes in magnitudes of multiple vector dimensions in addition to (or instead of) analyzing each dimension separately. In some embodiments, the group-based event analysis service may focus on the dimensions of the multi-dimensional vectors in a particular group that do not usually change for the particular group, for example, by excluding attributes that are known to change frequently from inclusion in the vector or by not updating the vector magnitudes corresponding to attributes that are known to change frequently. For example, in a grouping of event streams or portions of event streams that usually have a particular recipient and have a large range of usual data traffic, the group-based event analysis service may update a dimension of the multi-dimensional vectors corresponding to a recipient and may forgo updating a dimension of the multi-dimensional vectors corresponding to data traffic. The group-based event analysis service may conserve computing resources and avoid missing anomalous activity due to non-anomalous noise activity by analyzing dimensions that are likely to be relevant to detecting an anomaly for a particular group.

Activity that is anomalous for a particular group of event streams or portions of event streams may be called group-anomalous activity. A group-based event analysis service may use a variety of techniques to detect group-anomalous activity, such as statistical techniques based on the multi-dimensional vectors corresponding to the event streams or the portions of the event streams. For example, a group-based event analysis service may determine that an event stream is acting anomalously based on the multi-dimensional vector of the event stream being beyond a threshold distance beyond the mean distance of the group from the center of the group. For example, a group-based event analysis service may determine an event stream is acting anomalously based on the multi-dimensional vector of the event stream having a distance from the center of the group that is more than double the average of the group for distance from the center, as an illustrative example. In some embodiments, the group-based event analysis service may use dimensions of the multi-dimensional vectors that have been determined to be relevant dimensions for statistical analysis, for example, dimensions corresponding to attributes which change infrequently or predictably. In some embodiments, the group-based event analysis service may update and use all dimensions of the multi-dimensional vectors, and the group-based event analysis service may apply greater weightings to dimensions that have been determined to be relevant for a particular group compared to dimensions that have been determined to be less relevant for the particular group when performing calculations related to the particular group.

Upon determining events making up activity of an event stream or activity of a portion of an event stream are group-anomalous, the group-based event analysis service may determine whether the activity is benign or considered harmful. The group-based event analysis service may determine whether the activity is benign or considered harmful by automatically comparing the events making up the activity to known activity that is considered harmful, by analyzing the activity with a machine learning model trained to detect activity that is considered harmful, by forwarding information about the activity to another component of a security service that is using the group-based event analysis service, by requesting human review, or another method of determining whether the activity is benign or considered harmful. The group-based event analysis service may consider the severity of group-anomaly in determining whether activity is considered harmful. For example, the group-based event analysis service may set a threshold for similarity to a known activity that is considered harmful lower for an event flow that has exceeded a high threshold for group-anomaly than for an event flow that has exceeded a lower threshold for group-anomaly.

Upon determining the group-anomalous activity is considered harmful, the group-based event analysis service may cause a mitigation action to be taken against the event stream or portion of the event stream exhibiting the activity that is considered harmful, for example, the group-based event analysis service may cause a management component to terminate processes originating the event flow comprising the activity that is considered harmful, isolate one or more computing resources originating the event flow from the service provider network, or issue an alert message indicating the presence of activity that is considered harmful. The group-based event analysis service may perform more than one mitigation action, for example, the group-based event analysis service may both cause a management component to terminate processes originating the event flow comprising the activity that is considered harmful and issue an alert message indicating the presence of activity that is considered harmful. The group-based event analysis service may store a snapshot of a state of the computing resource generating the terminated processes for further analysis, or may cause a snapshot of the state of the terminated processes to be stored. The service provider network may automatically perform one or more failover operations to reallocate computing resources between services in response to the group-based event analysis service's mitigation action, so a service involved in the mitigation action may not be negatively affected by the mitigation action. In some embodiments, the group-based event analysis service may perform one or more mitigation actions in response to a determination that activity of an event stream or a portion of an event stream is group-anomalous.

The group-based event analysis service may redesignate groupings of the event streams or the portions of event streams periodically, on request, or in response to an occurrence, for example a determination that an event stream or portion of an event stream is group-anomalous or a determination that a statistical threshold other than an event stream or portion of event stream being determined to be group-anomalous has been reached. For example, the group-based event analysis service may determine an event flow is group-anomalous based on the multi-dimensional vector of the event flow being located at or beyond a particular distance from the nearest multi-dimensional vector of the same group, and the group-based event analysis service may determine a redesignation of at least some groupings is needed based on more than one multi-dimensional vectors of the event flows being located at or beyond a different distance from the centers of their respective groups. As another example, the group-based event analysis service may determine a redesignation of groupings is needed based on a group statistic, such as the average distance from event flow vectors to the center being above a threshold value.

The group-based event analysis service may use a variety of techniques to group and monitor event streams or portions of event streams. Grouping techniques may be heuristic or probabilistic techniques, or a combination of heuristic or probabilistic techniques. Probabilistic techniques may include statistical techniques. As an example, a group-based event analysis service may use a k-means clustering. For a group-based event analysis service to implement k-means clustering, a number (k) of centroids are randomly placed in a multi-dimensional vector-space, vectors corresponding to event streams or portions of event streams in the vector-space are associated with the nearest centroid so that the event streams or portions of event streams are sorted into k groups, and the actual centers of the k groups are calculated based on the vectors of the k groups. The group-based event analysis service may further find the distance of each vector from the center of the group, find the average distance of the vectors from the center of the group, and monitor the event streams or portions of event streams for changes that cause a vector's distance from the center of the group to exceed a threshold that is based on the average distance of the vectors from the center of the group.

As another example, a group-based event analysis service may use fuzzy-c-means clustering. For a group-based event analysis service to implement fuzzy-c-means clustering, a number the of centroids are randomly placed in a multidimensional vector-space, each vector corresponding to an event stream or a portion of an event stream in the vector-space is associated with each of the c centroids for various weight values that sum to 1, and actual centers for the c groups are calculated using the weight values of the vectors. Similarly to the k-means clustering example, the group-based event analysis service may detect group-anomalous activity based on statistical techniques such as monitoring the changes of vector locations in comparison to average vector locations, with adjustment for the weight values. In this example, event streams or portions of event streams would partially belong to all groups and would belong more to closely related groups and less to unrelated groups.

FIG. 1 is a block diagram illustrating a service provider network with a group-based event analysis service, according to some embodiments.

Figure 7:
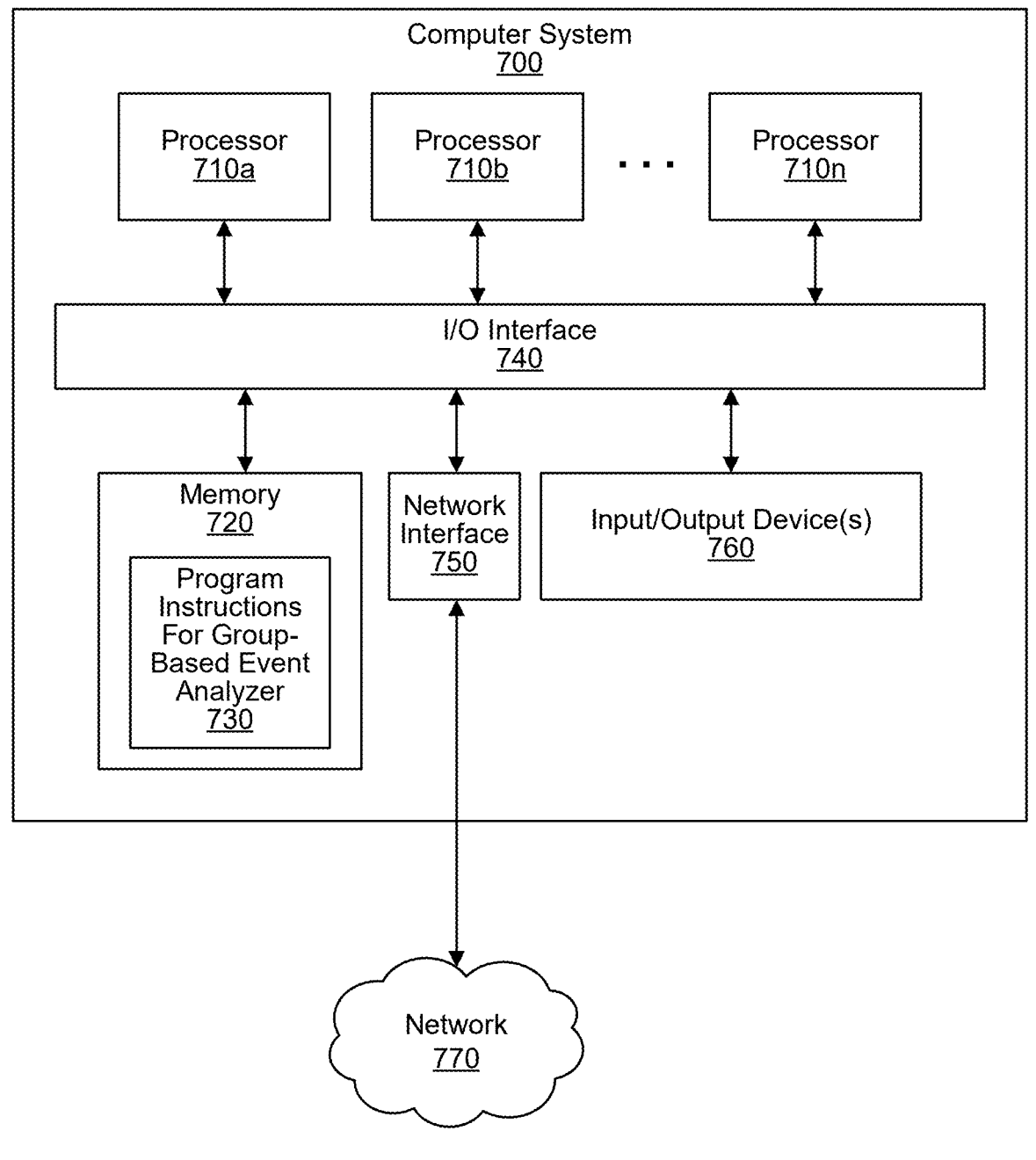
FIG. 7 is a block diagram illustrating an example computer system that implements some or all of the techniques described herein, according to some embodiments.

A service provider network 100 may operate on a plurality of computing resources, for example, computing resources such as computer system 700 illustrated in FIG. 7. Service provider network 100 may host services database service 104, object data store service 106, other storage service 112, virtual compute service 110, other compute service 108, and other services 114. These services may provide the use of computing resources to client(s) 118, for example, object data store service 106 may provide data storage to client(s) 118 and virtual compute service 110 may provide compute instances or virtual machines to client(s) 118. Client(s) 118 may access services of a service provider network 100 via a network 116. Client(s) 118 may have no access to internal management processes and the code base of internal management processes of the service provider network 100. A group-based event analysis service 102 may be run on a compute instance of virtual compute service 110.

Service provider network 100 may be set up by an entity such as a company or public sector organization to provide one or more services (such as various types of cloud-based computing or storage) accessible via the Internet and/or other networks to client(s) 118. Service provider network 100 may include numerous data centers hosting various resource pools, such as collections of physical and/or virtualized computer servers, storage devices, and networking equipment needed to implement and distribute the infrastructure and services offered by service provider network 100. Database service 104 may include relational or non-relational (NoSQL) database query engines, map reduce processing, data flow processing, and/or other large scale data processing techniques. Object data store service 106 may store data objects using a lookup key. For example, object data may be stored as a data blob that can be referenced using the lookup key. Other storage service 112 may be another type of data storage service, for example a block-based storage or a log-based storage. Client(s) 118 may access the various services provided by service provider network 100 via network 116. In some embodiments the client(s) 118 may include respective client networks connecting a plurality of various types of computer resources to the server provider network 100. Network 116 may be a public network, for example, the Internet, or a private network.

A group-based event analysis service 102 may receive forwarded event stream(s) 120 that are forwarded from service-to-service event streams of the service provider network 100 to analyze. Services of the service provider network 100 may communicate with one another via service-to-service event streams. For example, virtual compute service 110 may communicate with database service 104 via a service-to-service event stream, and a computing host of virtual compute service 110 may communicate with another computing host of virtual compute service 110 via a service-to-service event stream. Services may communicate with customers via a service-to-customer event stream, for example, virtual compute service 110 may communicate with client(s) 118 via a service-to-customer event stream. Client(s) 118 may also communicate with services via a service-to-customer event stream. However, the service-to-customer event streams may be distinct from the service-to-service event streams.

An event stream may comprise one or more events or event flows. An event flow may comprise one or more events sharing a common origin, such as a particular process. For example, two computing hosts of virtual compute service 110 may communicate with one another via an event stream. The first computing host may communicate with the second computing host via a first event flow comprising a set of events wherein the first computing host sends one or more packets to the second computing host, and the second computing host may communicate with the first computing host via a second event flow comprising a set of events wherein the second computing host sends one or more packets to the first computing host. As another example, two computing hosts of virtual compute service 110 may communicate with one another via an event stream. The first computing host may communicate with the second computing host via an event flow, and the second computing host may not communicate with the first computing host.

In some embodiments, the service provider network 100 may perform automatic failover operations in response to the group-based event analysis service 102 performing a mitigation action, for example, the service provider network 100 may instantiate a process that the group-based event analysis service 102 terminated on a computing resource of the service provider network 100 other than the computing resource on which the terminated process was previously instantiated. For example, a management process that is exhibiting anomalous behavior may be terminated and at the same time a replacement management process may be instantiated on a replacement computing resource. The replacement management process may be instantiated from a trusted machine image for implementing the management process. In this way, any modifications or mutations of the code base that were responsible for the anomalous behavior are not carried over to the replacement management processes, as it is instantiated from a trusted machine image.

Figure 2:
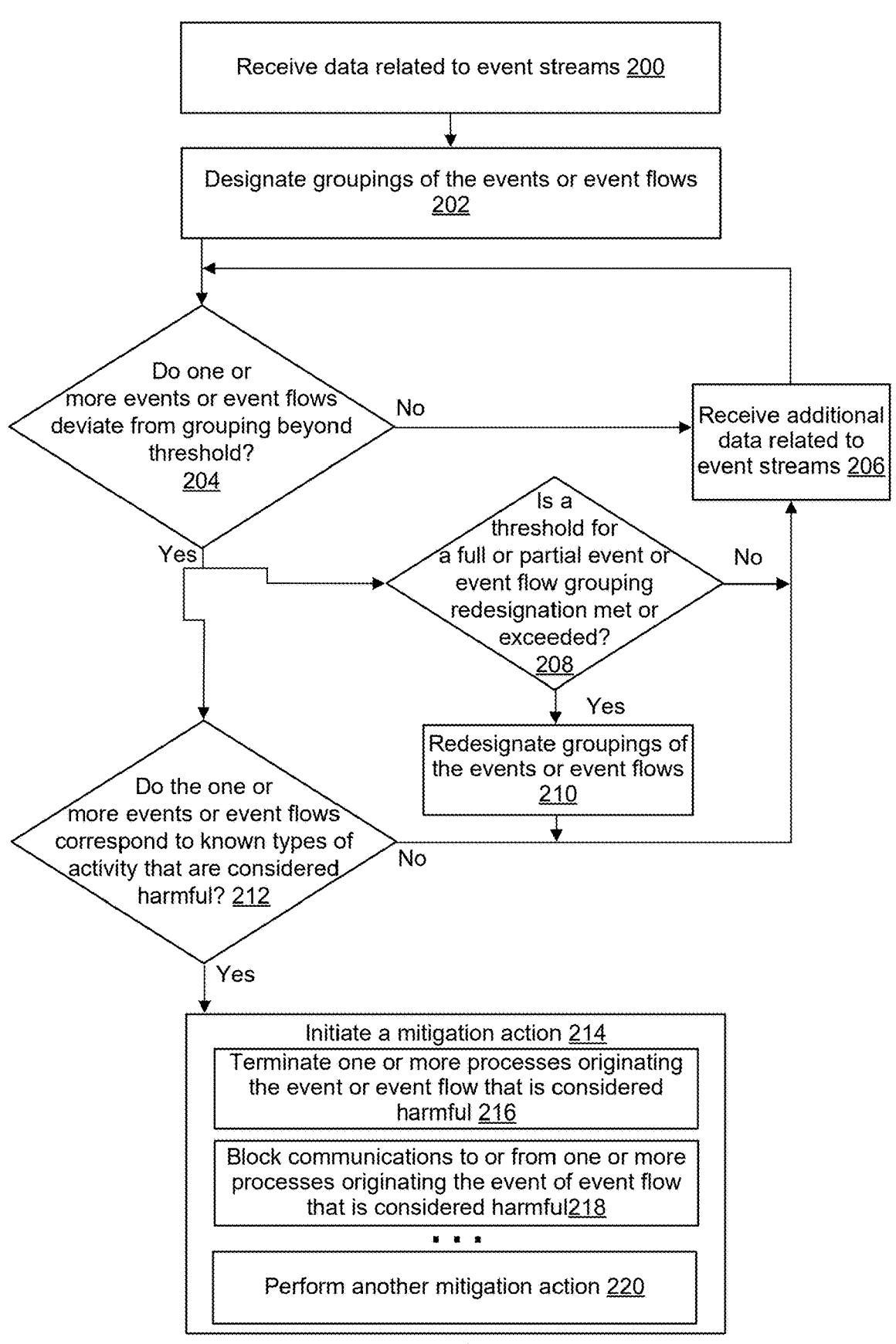
FIG. 2 is a flowchart of a method of implementing a group-based event analysis service, according to some embodiments.

FIG. 2 is a flowchart of a method of implementing a group-based event analysis service, according to some embodiments.

At step 200, the group-based event analysis receives data related to event streams. The data related to the event streams may include information for determining attributes of the event streams, event flows, and events. The received data related to the event streams may also include the events and event flows, themselves, that are included in the service-to-service event streams.

At step 202, the group-based event analysis service designates groupings of the events or event flows. The group-based event analysis service may use a probabilistic technique, such as a statistical-based technique such as k-means or fuzzy-c-means techniques (or other suitable grouping techniques), to designate groupings of the events or event flows. For example, the group-based event analysis service may designate groupings of the events or event flows based on similarities between attributes of the events or event flows, for example by analyzing multi-dimensional vectors that are generated based on the attributes of the events or event flows.

At step 204, the group-based event analysis service determines whether one or more events or event flows deviate from their respective groupings beyond a threshold. The group-based event analysis service may use a threshold based on the group as a whole (for example, a percentage beyond the mean distance from the center of the group), based on group members (for example, a distance from the nearest group member), or a combination thereof (for example, under the mean distance from the center of the group or within a distance from the nearest group member).

If the group-based event analysis service determines there is no event or event flow deviating from their respective groupings beyond a threshold, at step 206 the group-based event analysis service receives additional data related to event streams 206 and the process is repeated for the additional data. The additional data may contain information that indicates an attribute of an event or event flow has changed. The group-based event analysis service may change a magnitude of a dimension of a multi-dimensional vector associated with the event or event flow in response to receiving the information that indicates an attribute of the event or event flow has changed.

If the group-based event analysis service determines there is one or more events or event flows deviating from their respective groupings, the group-based event analysis service proceeds to steps 208 and 212. At step 208, the group-based event analysis service determines whether a threshold for a full or partial event or event flow grouping redesignation is met or exceeded. In some embodiments, the threshold for a grouping resignation may be a determination at step 204 that an event or event flow is anomalous.

In some embodiments, a threshold used by the group-based event analysis service to make a determination at step 208 may be a threshold similar to a threshold the group-based event analysis service uses to make a determination at step 204 (e.g. a threshold for detecting anomalous behavior). For example, the group-based event analysis service may use a threshold for detecting anomalous behavior wherein the multi-dimensional vector of one event or event flow is at a distance of 300% the mean distance of the grouping from the center of the grouping, and the group-based event analysis service may use a threshold for step 208 (e.g. a threshold for determining to redesignate groupings) wherein the multi-dimensional vector of more than one event or event flow is at a distance of 200% the mean distance from the center of the grouping. In some embodiments, the threshold for determining to redesignate groupings may be dissimilar to the threshold for detecting anomalous behavior, for example, the threshold the group-based event analysis service uses for detecting anomalous behavior may be based on a vector's distance from the nearest vector in the group, and the threshold the group-based event analysis service uses for determining to redesignate groupings may be the mean distance from the center of the grouping exceeding a value.

If the group-based event analysis service determines a threshold for determining to redesignate groupings is not met or exceeded, the group-based event analysis service proceeds to step 206. If the group-based event analysis service determines a threshold for determining to redesignate groupings is met or exceeded, the group-based event analysis service proceeds to step 210.

At step 210, the group-based event analysis service redesignates groupings of the events or event flows. The group-based event analysis service may use grouping techniques similar to the grouping techniques the group-based event analysis service uses at step 202 to initially determine groupings. Other events or determinations that are not illustrated in FIG. 2 may cause the group-based event analysis service to redesignate groupings of the events or event flows. For example, the group-based event analysis service may redesignate groupings periodically, such as daily or weekly. As another example, the group-based event analysis service may redesignate groupings in response to a determination, such as the determination at step 212, that an event or event flow is considered harmful. As another example, the group-based event analysis service may redesignate groupings in response to an expected change in service-to-service event streams, such as a code base update which could cause changes to event stream behavior. The group-based event analysis service may also redesignate groupings at the request of a manager or for another reason.

At step 212, the group-based event analysis service determines whether the one or more events or event flows, determined at step 204 to be anomalous, correspond to known types of activity that are considered harmful. The group-based event analysis service may make the determination of step 212 by checking the event or event flow for similarity to previously identified activity that is considered harmful. The group-based event analysis service may analyze the anomalous event or event flow or a snapshot of a process or processes that were originating the anomalous event or event flow, in addition to the multi-dimensional vector and attribute data that was included in the multi-dimensional vector. The group-based event analysis service may determine that an event or event flow comprises activity that is considered harmful with other analysis techniques, for example by using a machine learning model trained to identify activity that is considered harmful.

If the group-based event analysis service determines the one or more events or event flows do not correspond to known types of activity that are considered harmful, the group-based event analysis service proceeds to step 206. If the group-based event analysis service determines the one or more events or event flows correspond to known types of activity that are considered harmful, the group-based event analysis service proceeds to step 214. In some embodiments, a group-based event analysis service may make further determinations in response to a determination of the presence of activity that is considered harmful, for example, the group-based event analysis service may perform further analysis to ensure that a proposed mitigation action does not adversely affect the operation of a service. Such further determinations may provide guardrails on the output of the group-based event analysis service. For example, a guardrail determination may take into account whether the process or processes originating the activity that is considered harmful are necessary for the proper functioning of the service provider network, whether terminating the process or processes originating the activity that is considered harmful may cause harm to the service provider network, and other determinations relating to whether to perform a mitigation action and which mitigation action to perform. The group-based event analysis service may take severity of the anomaly into account in making such guardrail determinations.

At step 214, the group-based event analysis service initiates a mitigation action. The group-based event analysis service may initiate a mitigation action by performing one or more of step 216, step 218, and step 220. At step 216, the group-based event analysis service terminates one or more processes originating the event or event flow that is considered harmful. At step 218, the group-based event analysis service blocks communications to or from one or more processes originating the event or event flow that is considered harmful. In some embodiments, the blocked communications may be communications to or from an external location, which may be blocked from communicating with other elements of the service provider network by blocking an IP address associated with the external location. At step 220, the group-based event analysis service performs another mitigation action.

Figure 3A:
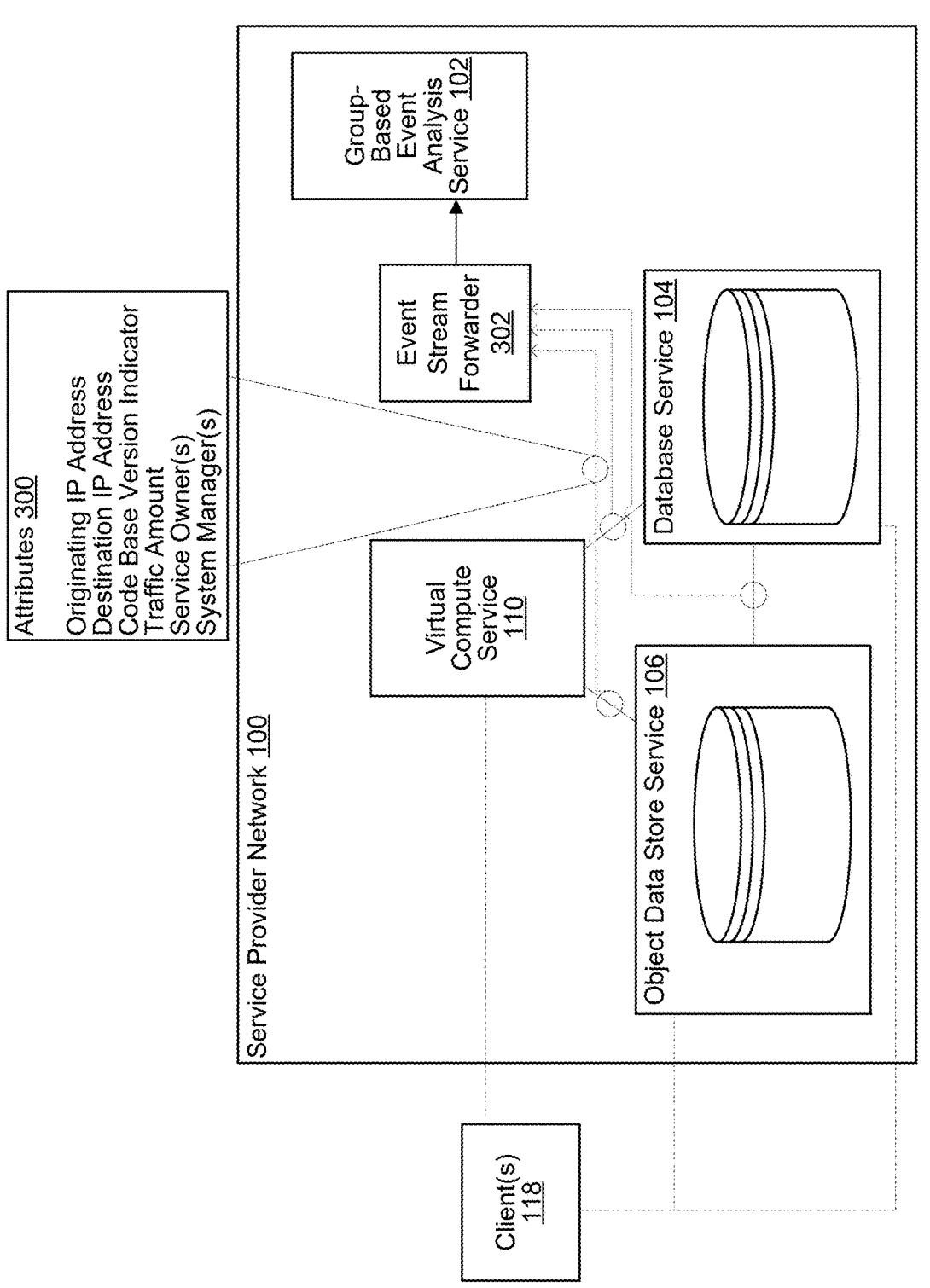
FIG. 3A is a block diagram illustrating service-to-service event streams within a service provider network, according to some embodiments.

FIG. 3A is a block diagram illustrating service-to-service event streams within a service provider network, according to some embodiments.

The virtual compute service 110, object data store service 106, and database service 104 communicate with one another via service-to-service event streams (represented by solid lines connecting the services). Client(s) 118, outside of the service provider network 100, communicate with the services of the service provider network via service-to-customer event streams (represented by large dash lines connecting the client(s) 118 to the services). The services, such as virtual compute service 110, object data store service 106, and database service 104, may be services of the same region or services of different regions. The event stream forwarder 302 may monitor the service-to-service event streams. The event stream forwarder 302 may use forwarding agents to obtain information about the service-to-service event streams, including attributes 300 of the service-to-service event streams.

Forwarding agents may be code of the event stream forwarder 302 installed on various components of the service provider network 100. The forwarding agents may monitor and analyze communications of the service provider network 100 and identify particular aspects of the communications to forward to the group-based event analysis service 102. The forwarding agents may be part of a distributed event stream forwarder 302, and forwarding agents may be configured to forward identified information to a central event stream forwarder 302 which forwards the identified information to a group-based event analysis service 102.

The event stream forwarder 302 may use the forwarding agents to obtain information about the attributes 300 of the service-to-service event streams and may forward the information about the attributes 300 to the group-based event analysis service 102. The information about the attributes may be code that can be parsed to identify an attribute or data that in aggregate could indicate an attribute. The particular attributes shown in FIG. 3A (originating IP address, destination IP address, code base version indicator, and traffic amount) are example attributes of a non-exclusive list of possible attributes 300 that the event stream forwarder 302 obtains. Some attributes 300 may be specific to an event (for example, destination IP address) and some attributes may describe the whole of an event stream or event flow (for example, traffic amount).

Figure 3B:
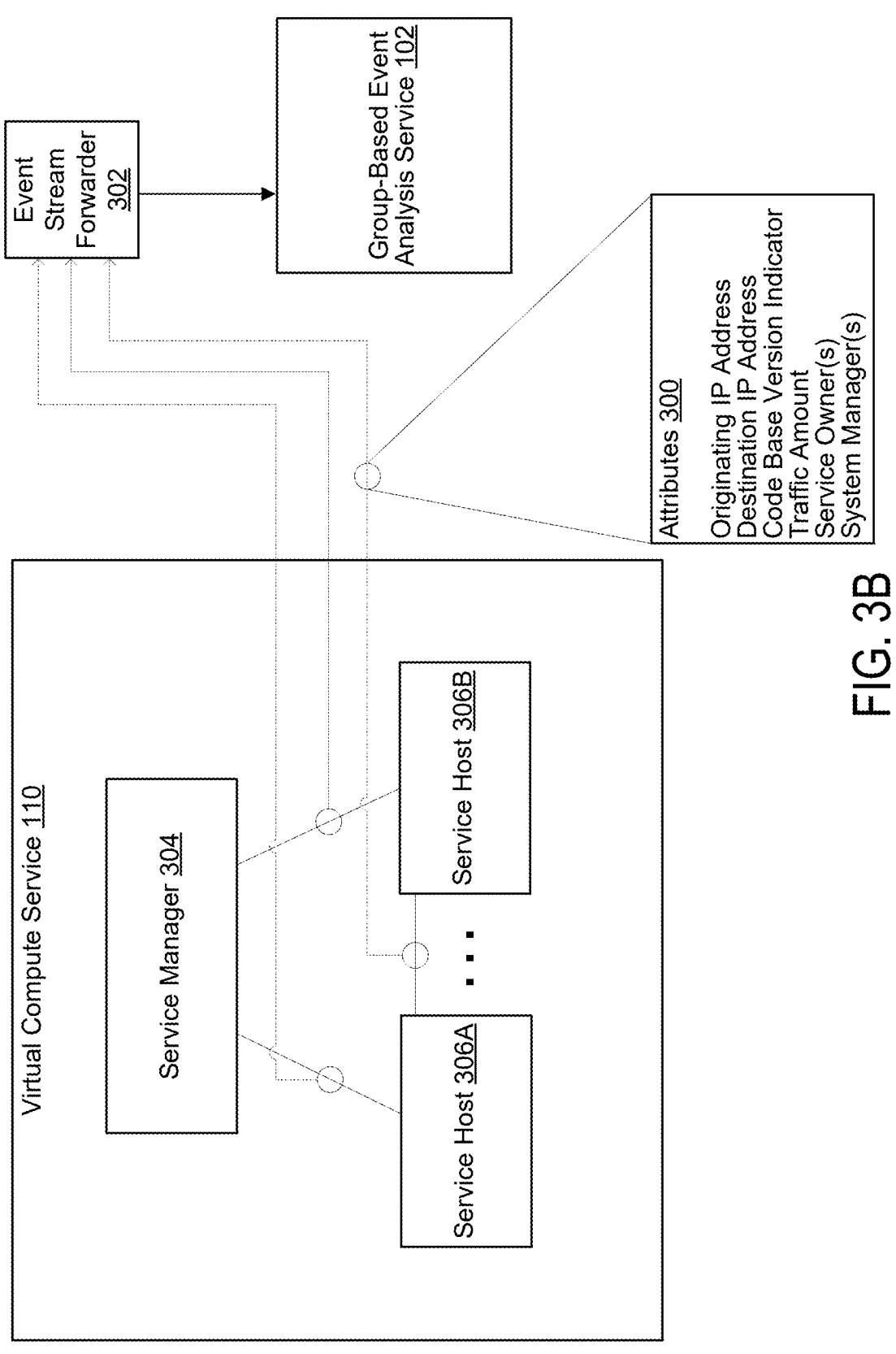
FIG. 3B is a block diagram illustrating service-to-service event streams being communicated via a control plane of a service, according to some embodiments.

FIG. 3B is a block diagram illustrating service-to-service event streams being communicated via a control plane of a service, according to some embodiments.

Service-to-service event streams may be intra-service event streams, such as the event streams between a service manager 304, service host 306A, and service host 306B of virtual compute service 110. However, the service-to-service event streams may also be inter-service event streams, such as the example traffic shown in FIG. 3A. For example, the computing resources implementing service manager 304, service host 306A, and service host 306B may communicate with one another via service-to-service event streams that are internal to a given service (e.g., intra-service event streams). The computing resources implementing service manager 304, service host 306A, and service host 306B may be computing hosts of the same region or computing hosts of different regions. The event stream forwarder may monitor such intra-service service-to-service event streams and forward information about attributes 300 to a group-based event analysis service.

Figure 3C:
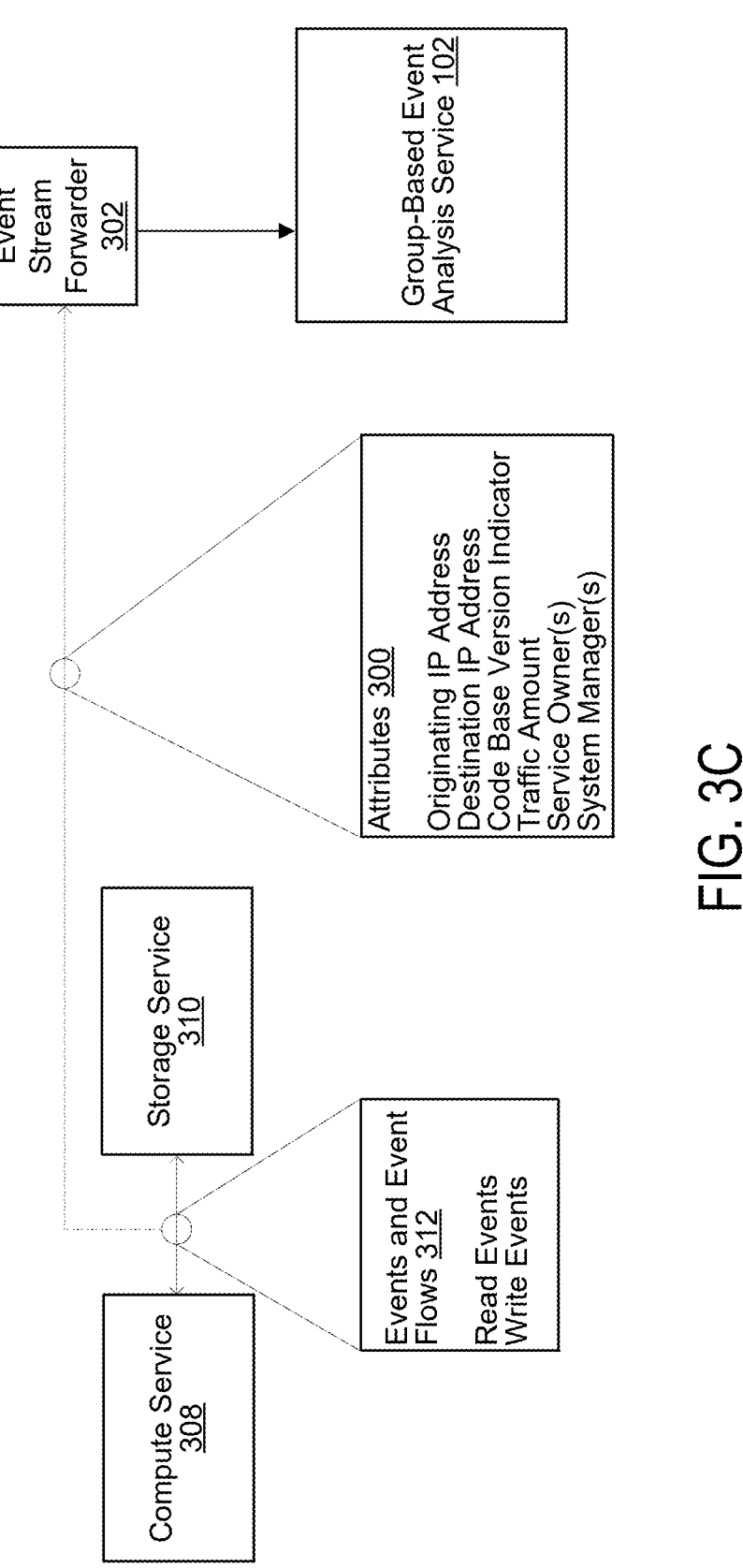
FIG. 3C is a block diagram illustrating events and event flows within service-to-service event streams, according to some embodiments.

FIG. 3C is a block diagram illustrating events and event flows within service-to-service event streams, according to some embodiments.

Service-to-service event streams, such as the event stream illustrated between compute service 308 and storage service 310, may be comprised of one or more events and event flows 312, such as the example list of possible event flows shown in FIG. 3C (read events and write events). Events and event flows may have attributes 300. Event stream forwarder 302 may monitor event streams for information about attributes 300 of events and event flows of the event streams, and event stream forwarder may send the obtained information about attributes 300 to a group-based event analysis service 102. In this example, the illustrated service-to-service event stream is an inter-service event stream, similar to the example traffic shown in FIG. 3A, however service-to-service event streams may also be intra-service event streams, such as the example traffic illustrated in FIG. 3B.

For inter-regional traffic, the information about the attributes of events and event flows may be summarized. Some information about the attributes of events and event flows may be included in a summarization with little or no modification, and some information about the attributes of events and event flows may be included in a summarization in a generalized or otherwise aggregated form.

Event flows within an event stream may have particular identities. The particular identities of event flows may be defined by attributes of the events that the event flow comprises, for example, the specific origination computing host or the type of events that make up the event flow, as illustrated in FIG. 3C.

Figure 3D:
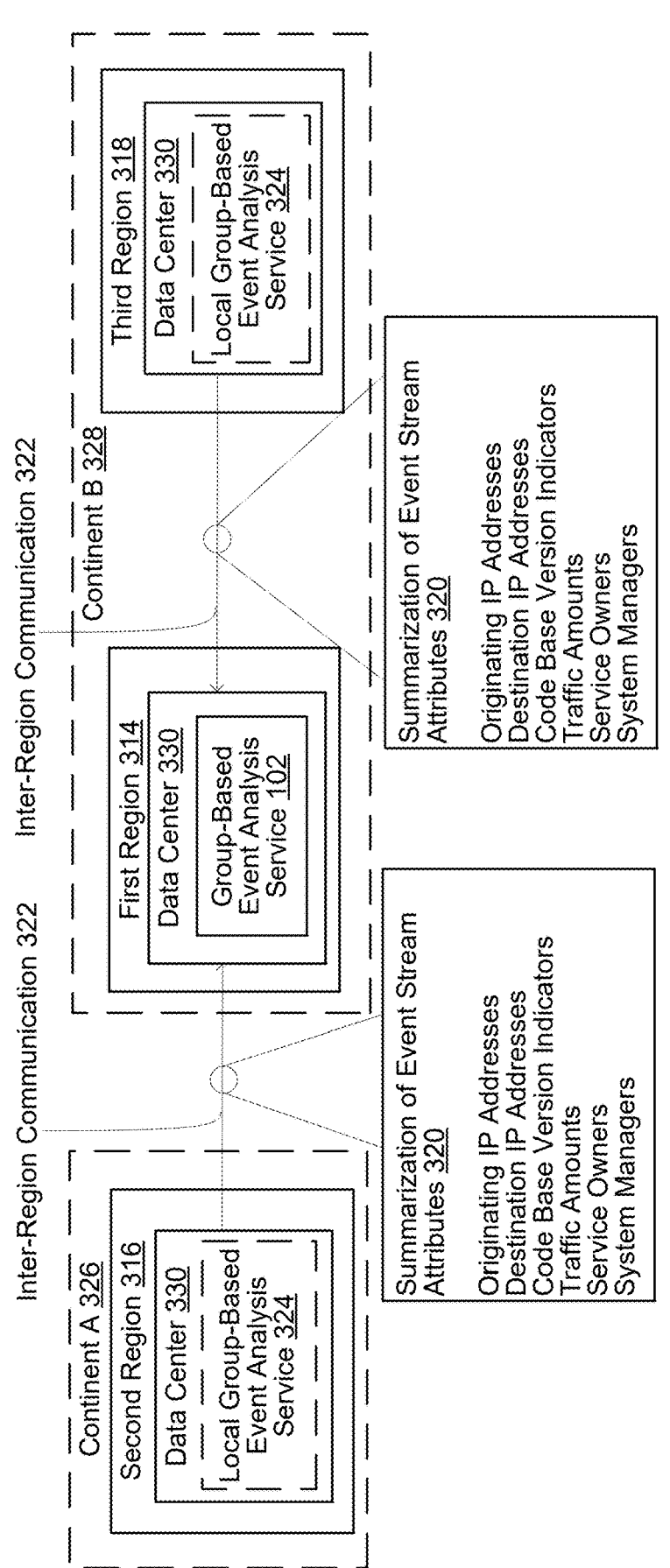
FIG. 3D is a block diagram illustrating information related to event streams being sent across regions of a service provider network, according to some embodiments.

FIG. 3D is a block diagram illustrating information related to event streams being sent across regions of a service provider network, according to some embodiments.

A service provider network 100 may include multiple regions, such as first region 314 and second region 316. Inter-region communication 322 may be limited, for example, communications between a first region 314 and a second region 316 may include transmission of information via long-distance cables, for example, trans-Atlantic cables that facilitate communication between the continents of North America and Europe. Regions may be on the same continent, such as the first region 314 and the third region 318 on continent B 328. Regions may be on different continents, such as the first region 314 on continent B 328 and the third region 316 on continent A 326.

A group-based event analysis service 102 may be hosted in a data center 330 of a first region 314 and may receive information about event streams of other regions such as the second region 316 and the third region 318 in the form of summarization of event stream attributes 320. Data centers 330 may communicate with other data centers 330 across regions via inter-region communication 322. Event streams or portions of event streams that originate from one region may be grouped with event streams or portions of event streams from another region.

A summarization of event stream attributes 320 may be sent from a second region 316 that is not hosting the group-based event analysis service 102 a first region that is hosting the group-based event analysis service 102. The summarization of event stream attributes 320 may include a portion of the information about the event stream attributes that is available to the region that originated the event streams. The portion of the information included in a summarization of event stream attributes 320 may be information that has previously been identified as particularly relevant information. The summarization of event stream attributes 320 may include intra-region statics of the region that is sending the summarization, such as intra-region statistics of the second region 316. The summarization of event stream attributes 320 may include a summary of inter-region communication 322 being communicated from the region that is sending the summarization, such as inter-region communication 322 originating in the second region 316, which may include inter-region communication 322 sent to a region that is not hosting the group-based event analysis service 102. In some embodiments, the group-based event analysis service 102 may be distributed across regions instead of being hosted by a single region. In some embodiments, the group-based event analysis service 102 may be distributed across data centers 330.

A second region 316 that is not hosting the group-based event analysis service 102 for the service provider network 100 may host a local group-based event analysis service 318. The local group-based event analysis service 324 may operate in the event communications between the first region 314 and the second region 316 fail or become impractical. In the event communications between regions fails or becomes impractical, the first region 314 hosting the group-based event analysis service 102 for the service provider network 100 may use the group-based event analysis service 102 for the service provider network 100 as a local group-based event analysis service 324 for the first region 314.

Figure 4:
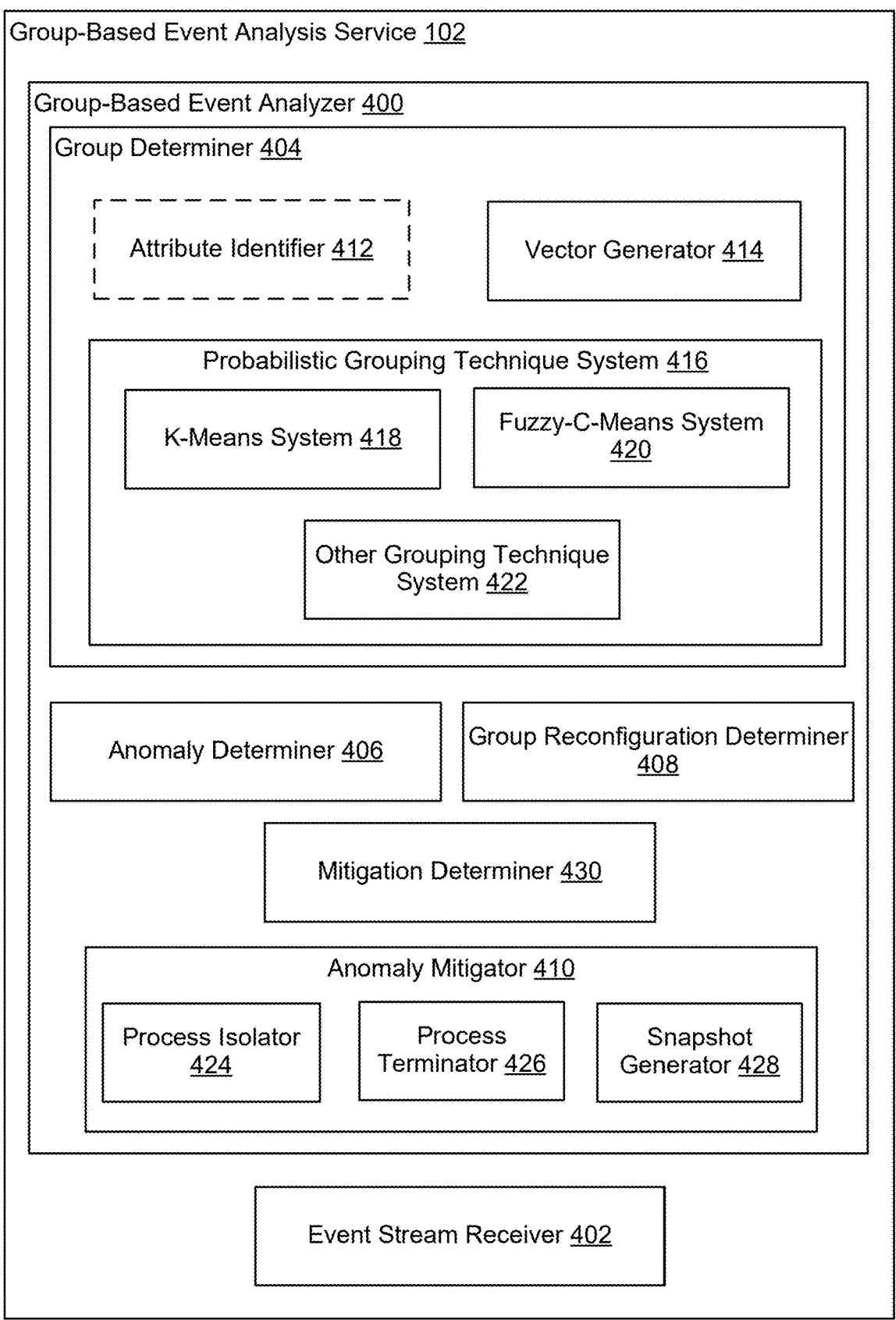
FIG. 4 is a block diagram illustrating a group-based event analysis service, according to some embodiments.

FIG. 4 is a block diagram illustrating a group-based event analysis service, according to some embodiments.

A group-based event analysis service 102 may include an event stream receiver 402, which may receive information from an event stream forwarder, and a group-based event analyzer 400, which may analyze the received information to detect anomalous events and event flows within the monitored service-to-service event streams.

The group-based event analyzer 400 may use a group determiner 404 to determine groupings of event streams or portions of event streams, such as events and event flows. Depending on the form of the information about the attributes the group-based event analysis service 102 receives, the group determiner 404 may use an attribute identifier 412 to obtain information about the attributes in a useful and relevant format for the group determiner 404 to use. The group determiner 404 may use vector generator 414 to generate multi-dimensional vectors that correspond to event streams or portions of event streams based on the attributes of the event streams or portions of the event streams. Vector generator 414 may comprise an unsupervised machine learning model that has been trained to generate multi-dimensional vectors based on attribute data.

The group determiner 404 may use a probabilistic grouping technique system 416 to designate groupings of the event streams or portions of event streams based on the multi-dimensional vectors. The probabilistic grouping technique system 416 may use a k-means system 418, a fuzzy-c-means system 420, an other grouping technique system 422, or a combination, to group the event streams or portions of event streams based on their corresponding multi-dimensional vectors.

A group-based event analyzer 400 may use an anomaly determiner 406 to determine that an event stream or portion of an event stream is group-anomalous. The anomaly determiner 406 may analyze the groupings as determined by the probabilistic grouping technique system 416 and changes to the multi-dimensional vectors as determined by vector generator 414 to identify event streams or portions of event streams that comprise activity that deviates from the respective designated groupings.

The group-based event analyzer 400 may use a group reconfiguration determiner 408 to identify when a condition for redesignating groupings using the probabilistic grouping technique system 416 has occurred. For example, the group reconfiguration determiner may cause the groupings to be updated periodically, in response to known system-wide changes such as a code base update, upon request, or in response to a determination made by the group-based event analyzer 400. For example, the group reconfiguration determiner 408 may determine redesignation of the groupings of event streams or portions of event streams is needed as a result of a determination by the anomaly determiner 406 that an event stream or portion of an event stream is anomalous, a determination by the mitigation determiner 430 that an event stream or portion of an event stream is considered harmful, or a determination by the group reconfiguration determiner 408 that changes to the multi-dimensional vectors associated with the event streams or portions of event streams have caused the multi-dimensional vectors to pass a threshold associated with grouping redesignation.

The group-based event analyzer 400 may use an anomaly mitigator 410 to prevent anomalous activity or activity that is considered harmful from occurring within the service provider network. The anomaly mitigator 410 may use a process isolator 424 or a process terminator 426 to respectively isolate or terminate a process that has been determined to originate a group-anomalous event or event flow, or an event or event flow that is considered harmful, as determined by anomaly determinator 406 and mitigation determiner 430, respectively.

The service provider network may automatically perform one or more failover operations in response to a mitigation action by the anomaly mitigator 410, for example, by instantiating the one or more processes on a computing resource that is different from the computing resource from which the one or more processors were terminated. The automatic failover operations of the service provider network may enable the anomaly mitigator 410 to automatically terminate processes originating group-anomalous events or event flows without negatively impacting services of the service provider network.

The anomaly mitigator 410 may use a snapshot generator 428 to store a snapshot of the state of a computing resource executing the process or processes originating the group-anomalous event or event flows prior to or at the time the process or processes are terminated. The snapshot generator 428 may enable later review of the anomalous activity, which may be used as forensic data for resolving or preventing possible problems with the service provider network, or as training data for identifying further anomalous activity.

The group-based event analyzer 400 may use the mitigation determiner 430 to determine whether events or event flows that are group-anomalous are considered harmful. The mitigation determiner 430 may compare the group-anomalous events or event flows to known activity that is considered harmful, or may use a machine learning model that has been trained to identify activity that is considered harmful. The mitigation determiner 430 may perform guardrail determinations, for example, determining whether a process can be safely terminated without causing damage to the service provider network. The mitigation determiner 430 may determine which mitigation action will be performed by the anomaly mitigator 410 in response to a determination that activity that is considered harmful is present. The severity of the detected anomaly may be a factor in mitigation determinations, and the anomaly determiner 406 or the mitigation determiner 430 may determine severity of the anomaly.

The group-based event analyzer 400 may use a determination that an event or event flow is considered harmful to make a determination to mitigate the process or processes originating the event or event flow. The group-based event analyzer 400 may also use a determination that an event or event flow is considered harmful to make a determination to redesignate groupings of event streams or event stream portions. The anomaly determiner 406 may use a determination of whether a group-anomalous event or event flow is considered harmful or not by the mitigation determiner 430 to tune the determination of whether events or event flows are anomalous.

Figure 5:
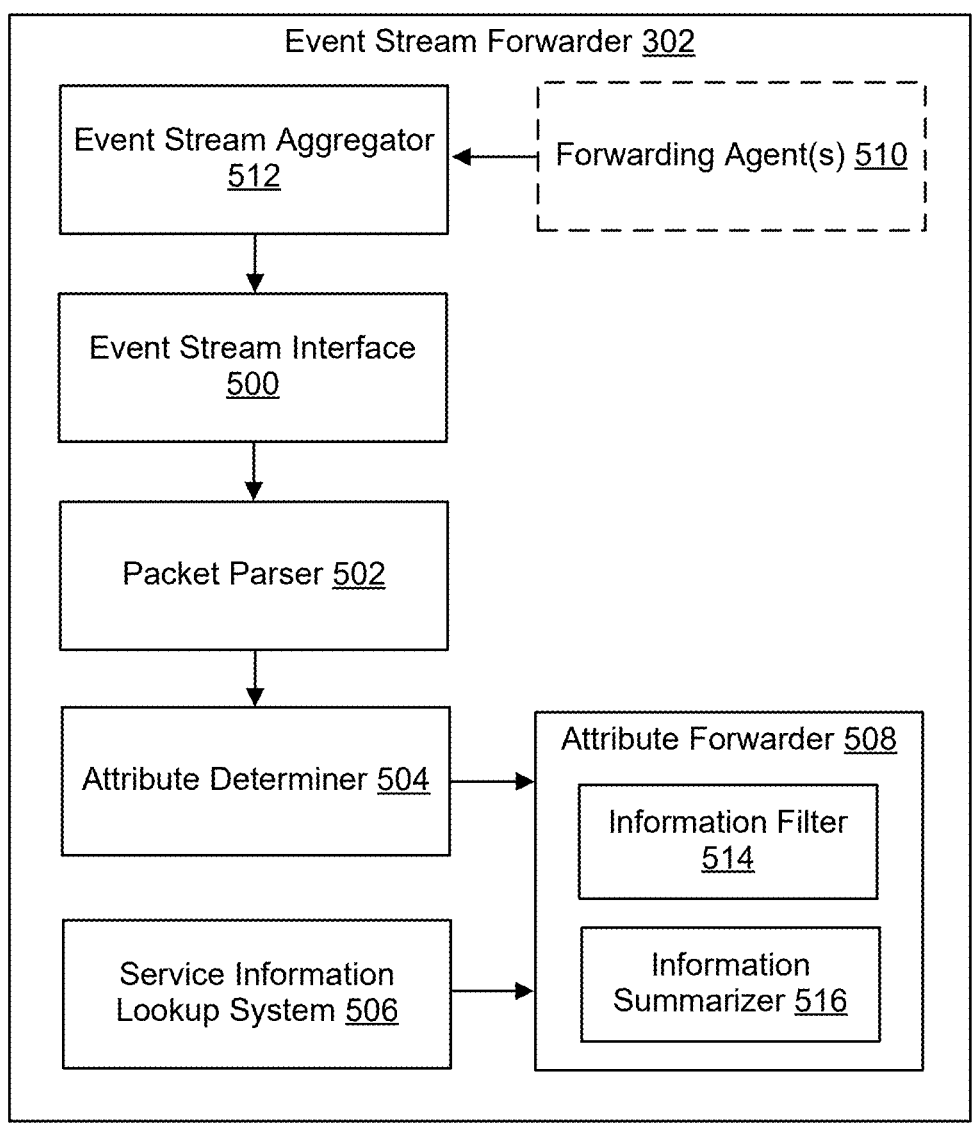
FIG. 5 is a block diagram illustrating an event stream forwarder, according to some embodiments.

FIG. 5 is a block diagram illustrating an event stream forwarder, according to some embodiments.

An event stream forwarder 302 may use forwarding agent(s) 510 to send information about service-to-service event streams to the event stream aggregator 512 of the event stream forwarder 302. Forwarding agent(s) 510 may be components of routers that handle service-to-service event streams. Forwarding agent(s) 510 may be forwarding agents as described in association with event stream forwarder 302 of FIG. 3A. The event stream aggregator 512 may aggregate the information about service-to-service event streams and provide the aggregated information to event stream interface 500.

Event stream interface 500 may receive the information about the service-to-service event streams and send the information to the packet parser 502. The packet parser may read communication packets to obtain information about the attributes of the service-to-service event streams. The attribute determiner 504 may use the information about the attributes of the service-to-service event streams to determine attributes of the service-to-service event streams that can be used to generate multi-dimensional vectors associated with the service-to-service event streams or portions of the service-to-service event streams. The service information lookup system 506 may obtain additional information about the service-to-service event streams that is not included within the service-to-service event streams. The additional information, along with information in the service-to-service event streams, may be used to determine attributes of the service-to-service event streams or portions of the service-to-service event streams.

The attribute determiner 504 and service information lookup system 506 may provide the attributes of the service-to-service event streams or portions of the service-to-service event streams to the attribute forwarder 508, which may forward the attributes to the group-based event analysis service. An attribute forwarder 508 may filter received information for information that has been determined to be relevant information using an information filter 514. An information filter 514 may prevent an attribute forwarder 508 from forwarding an excessive amount of information, for example, an information filter 514 may select a portion of an event stream as representative of the event stream's activity. An attribute forwarder 508 may use an information summarizer 516 to generate a summary of information that has been determined to be relevant information. An information summarizer 526 may generate a summarization of event stream attributes 320 for transmission between regions of a service provider network.

In some embodiments, an event stream forwarder may forward information about the service-to-service event streams without processing the information to determine the attributes of the service-to-service event streams, and instead the processing may occur in an attribute identifier of the group-based event analysis service, such as attribute identifier 412, as illustrated in FIG. 4. Attribute identifier 412 may include a packet parser 502, an attribute determiner 504, and a service information lookup system 506. An attribute identifier 412 including a packet parser 502, an attribute determiner 504, and a service information lookup system 506 may be used to generate a summarization of event stream attributes 320 for transmission between regions of a service provider network.

Figure 6A:
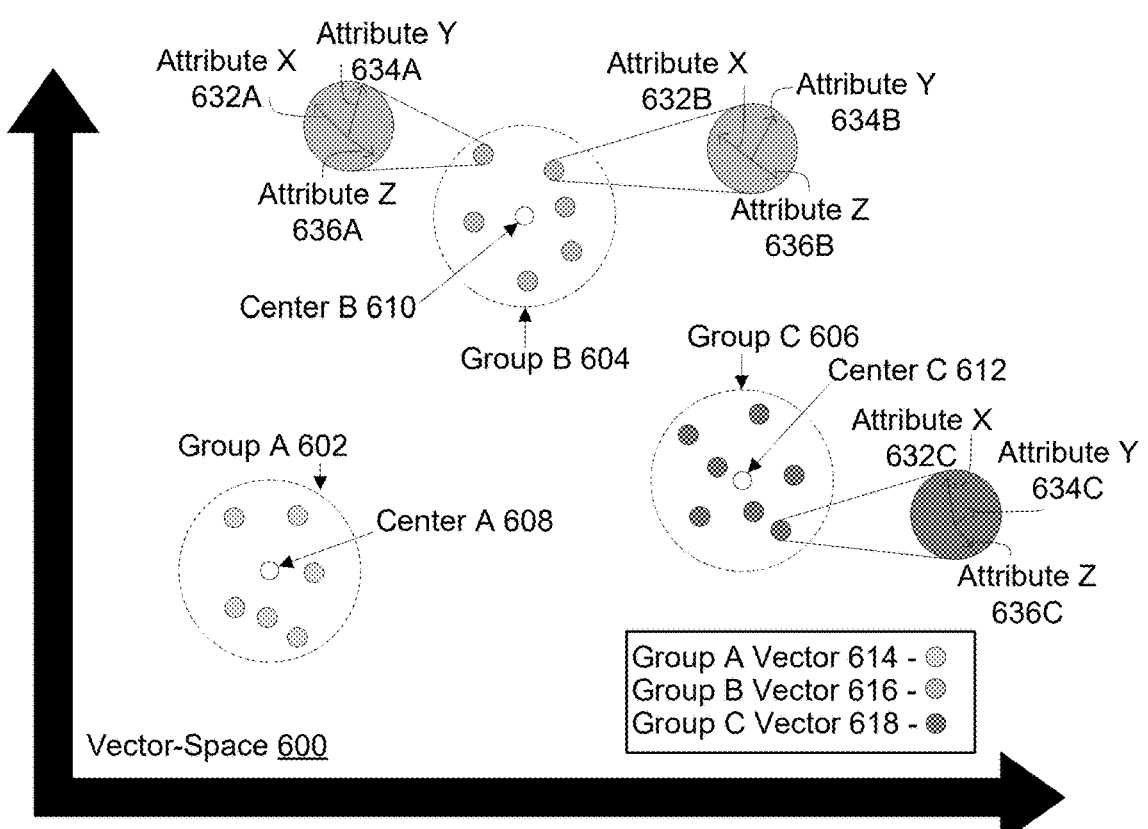
FIG. 6A illustrates a vector-space representation of a set of multi-dimensional vectors representing event streams at a first moment in time, such as after an initial grouping, according to some embodiments.

FIG. 6A illustrates a vector-space representation of a set of multi-dimensional vectors representing event streams at a first moment in time, such as after an initial grouping, according to some embodiments.

A group-based event analysis service may designate groups of event streams or portions of event streams based on the locations of multi-dimensional vectors corresponding to event streams or portions of event streams in a vector-space 600. Individual vectors may have dimensions corresponding to attributes, for example attribute X 632, attribute Y 634, and attribute Z 636. Similarity in the magnitudes and directions of the vectors may indicate vectors have similar attributes. For example, a vector having attribute X 632A, attribute Y 634A, and attribute Z 636A may be similar to a vector having attribute X 632B, attribute Y 634B, and attribute Z 636C. The vectors have few differences, which are slight, for example, attribute X 632B is shorter and less steep than attribute X 632A, and attribute Y 634B is shorter and less steep than attribute Y 634A.

Comparatively, both vectors are dissimilar to a vector having attribute X 632C, attribute Y 634C, and attribute Z 636C. For example, attribute X 632A and attribute X 632B are both less steep than attribute X 632C, attribute Y 634A and attribute Y 634B are longer and more steep than attribute Y 634C. Dissimilar vectors may have some similarities, for example, attribute Z 636C is a similar length and slightly less steep than attribute Z 636A and attribute Z 636B.

The group-based event analysis service may determine some attributes of a grouping are more relevant for that grouping than other attributes are. The group-based event analysis service may apply weights to the dimensions of the vectors corresponding to the determined relevance of the dimensions' corresponding attributes. In some embodiments, groupings may have respective vector-spaces with dimensions that correspond to the determined relevant attributes of the respective grouping.

Figure 6B:
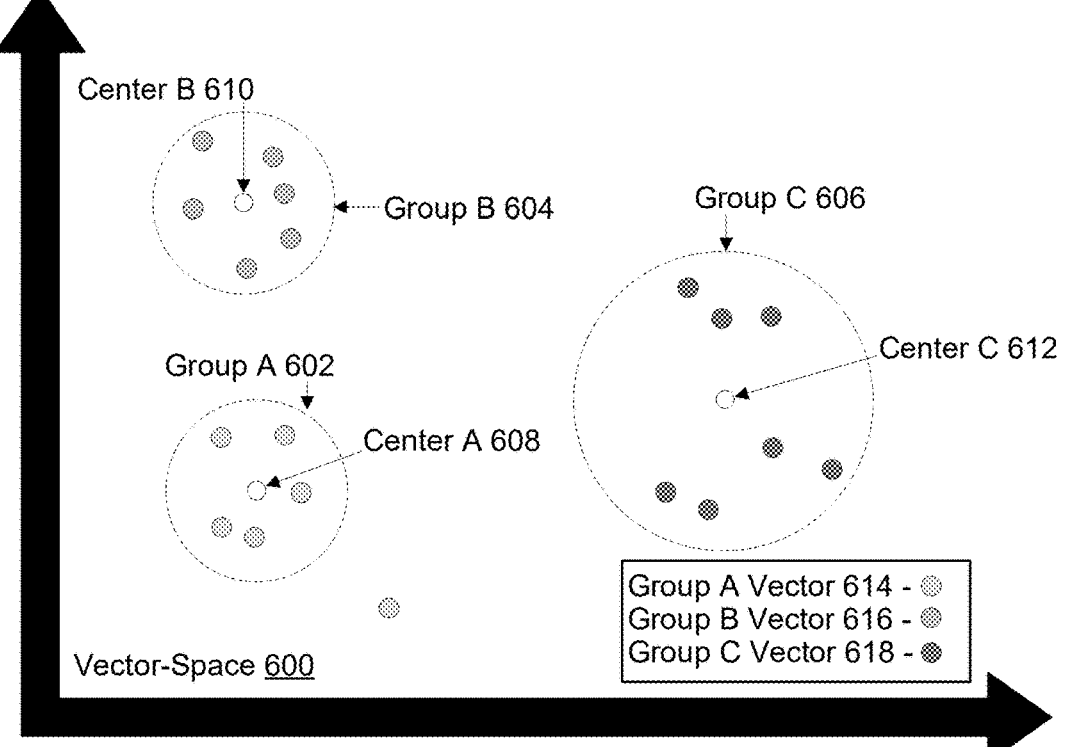
FIG. 6B illustrates the vector-space representation of the set of multi-dimensional vectors representing event streams at a second moment in time, such as after changes in the event streams have taken place after the initial grouping, according to some embodiments.
Figure 6C:
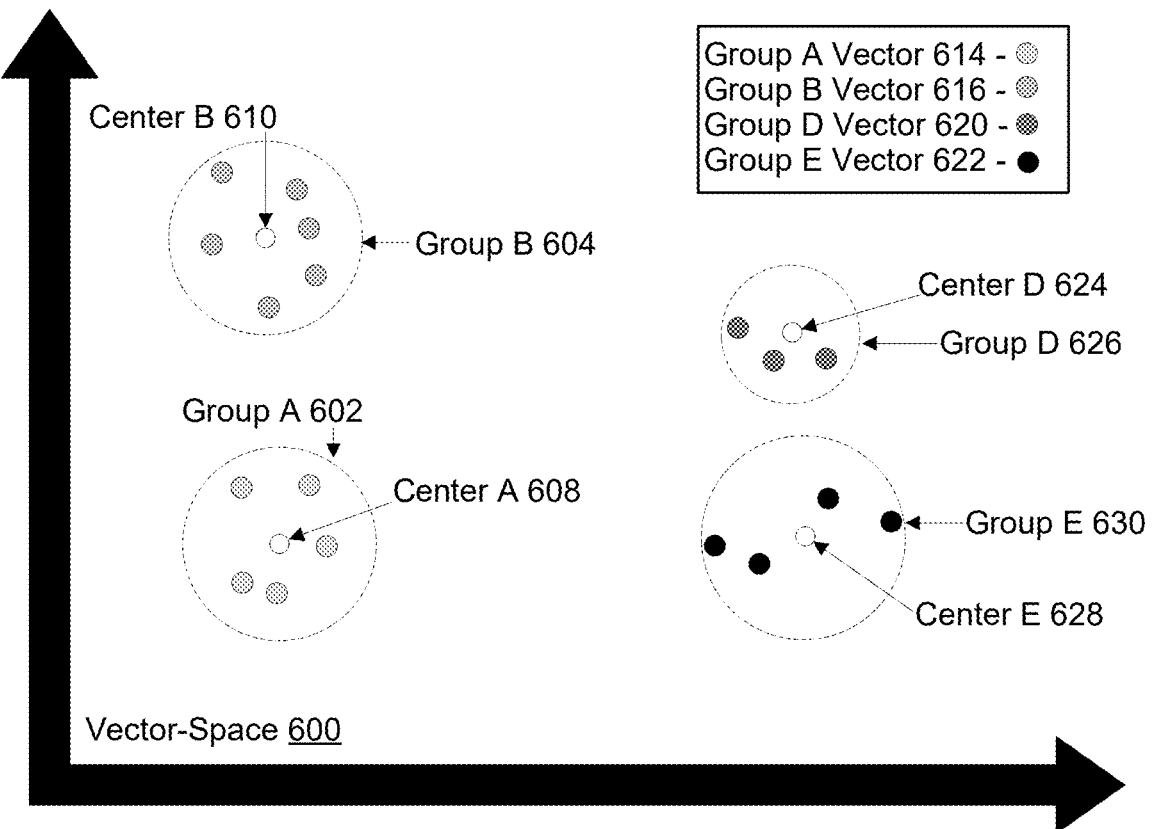
FIG. 6C illustrates the vector-space representation of the set of multi-dimensional vectors representing event streams at a third moment in time, such as after a regrouping, according to some embodiments.

The group-based event analysis service may use the similarities and dissimilarities of attributes of event streams or portions of event streams as represented by a multi-dimensional vector to designate groupings for the event streams or portions of event streams. Similarity and dissimilarity may be determined by the locations of vectors relative to each other or a center point, as illustrated in FIGS. 6A-6C. At the first moment in time shown in FIG. 6A, the group A vectors 614 are designated to group A 602, group B vectors 618 are designated to group B 604, and group C vectors 618 are designated to group C 606. Group A has a center A 608, and an outer threshold (marked by a dashed circled) representing a threshold distance from center A 608 that would indicate an event stream or portion of event stream beyond the threshold is anomalous. Group B 604 and Group C 606 also have a dashed circle indicating a threshold distance away from center B 610 and center C 612, respectively.

FIG. 6B illustrates the vector-space representation of the set of multi-dimensional vectors representing event streams at a second moment in time, such as after changes in the event streams have taken place after the initial grouping, according to some embodiments.

At the second moment in time, the event streams have changed such that the multi-dimensional vectors representing the event streams or portions of the event streams have changed locations. The group B vectors 616 have shifted left, one group A vector 614 has moved beyond the group A 602 threshold, and the group C vectors 618 have moved away from center C 612.

The single group A vector 614 beyond the threshold for group A 602 is group-anomalous. Something in the singular group A vector's attributes has caused the singular group A vector to become dissimilar to other group A vectors 614 that did not move significantly. The anomalous event or event flow that caused the observable change of the single group A vector moving away from group A 602 may be considered harmful or may not be considered harmful. A group-based event analysis service may terminate the one or more processes originating the group-anomalous event or event flow, or take another type of mitigation action, prior to a determination the event or event flow is considered harmful as a precaution.

The group B vectors 616 moved significantly, however, there is no group B vector 616 that is anomalous. Center B 610 and the outer threshold of group B 604 are defined by the locations of the group B vectors 616. Because the group B vectors 616 all moved the same distance in the same direction, none of the group B vectors are behaving anomalously. A change of the kind illustrated in group B 604 may be the result of a uniform change such as a code update.

The group C vectors 618 moved away from center C 612, but simultaneously such that the threshold of group C 606 enlarged without a group C vector 618 moving beyond the threshold. The group C vectors 618 also split into two distinct segments, an upper segment and a lower segment. The group-based event analysis service may determine that group redesignation would aid detection of anomalous events or event flows based on movement of vectors of a group away from the group center. A change of the kind illustrated in group C 606 may indicate that the initial groupings were not correct, or that a broad change has occurred in the service provider network that did not affect all event streams or portions of event streams included in the group, or did not affect all event streams or portions of event streams included in the group equally.

FIG. 6C illustrates the vector-space representation of the set of multi-dimensional vectors representing event streams at a third moment in time, such as after a regrouping, according to some embodiments.

At the third moment in time, the group-based event analysis service has made changes to the event streams and the groupings of the multi-dimensional vectors in response to the changes in the event streams at the second moment in time. The single group A vector 614 that was previously beyond the threshold of group A 602 is gone as a result of a mitigation action the group-based event analysis service took. The group-based event analysis service may have terminated a process that was originating the event flow associated with the single group A vector 614, isolated a process that was originating the event flow associated with the single group A vector 614, or performed another mitigation action. The group-based event analysis service may have determined the anomaly of the single group A vector 614 was not a result of activity that is considered harmful in the associated event flow, and reclassified the vector to another group, which is not illustrated.

Group B 604 did not contain an anomaly and did not indicate that group redesignation would aid detection of anomalous events or event flows. The group-based event analysis service has not made changes that affect group B 604 or the group B vectors 616.

Group C 606 is gone, and the group-based event analysis service has replaced it with group D 626 and group E 630. The group C vectors 618 have been redesignated as group D vectors 620 and group E vectors 622. The center D 624 and threshold for group D 626 are based on the locations of the group D vectors 620, and the center E 628 and threshold for group E 630 are based on the locations of the group E vectors 622. The group-based event analysis service may use statistical analysis, for example, a determination that the mean distance from the center of the group is above a threshold, to determine to increase the number of groupings of vectors. The group-based event analysis service may determine to decrease the number of groupings of vectors using similar statistical analysis, for example, the mean distance of vectors of a grouping to the center of another grouping being below a threshold. The group-based event analysis service may use other methods to determine to change the number of groupings of vectors.

Example Computer System

FIG. 7 is a block diagram illustrating an example computer system that implements some or all of the techniques described herein, according to some embodiments.

FIG. 7 illustrates exemplary computer system 700 usable to implement the group-based event analysis service as described above with reference to FIGS. 1-6C. In different embodiments, computer system 700 may be any of various types of devices, including, but not limited to, a network computer, a mobile device, a consumer device, application server, storage device, a peripheral device such as a switch, modem, router, or in general any type of computing or electronic device.

Various embodiments of program instructions for a group-based event analysis service, as described herein, may be executed in one or more computer systems 700, which may interact with various other devices. Note that any component, action, or functionality described above with respect to FIGS. 1-6C may be implemented on one or more computers configured as computer system 700 of FIG. 7, according to various embodiments. In the illustrated embodiment, computer system 700 includes one or more processors 710 coupled to a system memory 720 via an input/output (I/O) interface 740. Computer system 700 further includes a network interface 750 coupled to I/O interface 740, and one or more input/output devices 760. In some cases, it is contemplated that embodiments may be implemented using a single instance of computer system 700, while in other embodiments multiple such computer systems, or multiple nodes making up computer system 700, may be configured to host different portions or instances program instructions as described above for various embodiments. For example, in one embodiment some elements of the program instructions may be implemented via one or more nodes of computer system 700 that are distinct from those nodes implementing other elements.

In some embodiments, computer system 700 may be implemented as a system on a chip (SoC). For example, in some embodiments, processors 710, memory 720, I/O interface 740 (e.g., a fabric), etc. may be implemented in a single SoC comprising multiple components integrated into a single chip. For example, a SoC may include multiple CPU cores, a multi-core GPU, a multi-core neural engine, cache, one or more memories, etc. integrated into a single chip. In some embodiments, a SoC embodiment may implement a reduced instruction set computing (RISC) architecture, or any other suitable architecture.

System memory 720 may be configured to store compression or decompression program instructions for a group-based event analysis service 730 accessible by one or more of the processors 710. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions for a group-based event analysis service 730 may be configured to implement any of the functionality described above. In some embodiments, program instructions and/or data may be received, sent, or stored upon different types of computer-accessible media or on similar media separate from system memory 720 or computer system 700.

In one embodiment, I/O interface 740 may be configured to coordinate I/O traffic between processor 710, system memory 720, and any peripheral devices in the device, including network interface 750 or other peripheral interfaces, such as input/output devices 760. In some embodiments, I/O interface 740 may perform any necessary protocol, timing, or other data transformations to convert data signals from one component (e.g., system memory 720) into a format suitable for use by another component (e.g., processor 710). In some embodiments, I/O interface 740 may include support for devices attached through various types of peripheral buses, such as a variant of the Peripheral Component Interconnect (PCI) bus standard or the Universal Serial Bus (USB) standard, for example. In some embodiments, the function of I/O interface 740 may be split into two or more separate components, such as a north bridge and a south bridge, for example. Also, in some embodiments, some or all of the functionality of I/O interface 740, such as an interface to system memory 720, may be incorporated directly into processor 710.

Network interface 750 may be configured to allow data to be exchanged between computer system 700 and other devices attached to a network 770 (e.g., carrier or agent devices) or between nodes of computer system 700. Network 770 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 750 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 760 may, in some embodiments, include one or more display terminals, keyboards, keypads, touchpads, scanning devices, voice or optical recognition devices, or any other devices suitable for entering or accessing data by one or more computer systems 700. Multiple input/output devices 760 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 750.

As shown in FIG. 7, memory 720 may include program instructions for a group-based event analysis service 730, which may be processor-executable to implement any element or action described above. In one embodiment, the program instructions may implement the methods described above. In other embodiments, different elements and data may be included.

Computer system 700 may also be connected to other devices that are not illustrated, or instead may operate as a stand-alone system. In addition, the functionality provided by the illustrated components may in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
a service provider network, comprising:
   a first set of computing resources configured to implement, at least in part, a first service of the service provider network; and
   one or more other sets of computing resources configured to implement, at least in part, one or more other services of the service provider network,
   wherein the first set of computing resources and the one or more other sets of computing resources communicate with one another via one or more service-to-service event streams; and
   wherein at least one computing resource of the service provider network is configured to implement a group-based event analysis service configured to:
      obtain data related to the one or more service-to-service event streams;
      designate groupings of events or event flows within the one or more service-to-service event streams;
      determine whether an event or an event flow of a given one of the designated groupings comprises anomalous activity relative to other events or event flows included in the given designated grouping; and
      in response to determining an event or an event flow of a given designated grouping comprises anomalous activity, cause one or more processes originating the event or event flow to be terminated.

2. The system of claim 1, wherein the least one computing resource of the service provider network configured to implement the group-based event analysis service is further configured to:
   determine whether the anomalous activity is considered harmful,
   wherein said termination of the one or more processes originating the anomalous activity is further performed in response to a determination that the anomalous activity is considered harmful activity.

3. The system of claim 1, wherein the service provider network is configured to:
   automatically perform one or more failover operations in response to the termination of the one or more processes, wherein the one or more failover operations comprise:
      instantiating the one or more processes on a replacement computing resource that is a different computing resource than a computing resource for which the one or more processes were terminated.

4. The system of claim 1, wherein the group-based event analysis service is further configured to:
   store a snapshot of a state of a computing resource executing the terminated one or more processes.

5. The system of claim 1, wherein to designate groupings of the event or event flows of the one or more service-to-service event streams based on the received data, the group-based event analysis service implements a k-means grouping structure or a fuzzy-c-means grouping structure.

6. The system of claim 1, wherein the first set of computing resources and at least one of the one or more other sets of computing resources use a same code base.

7. The system of claim 1, wherein the first set of computing resources of the first service and the one or more sets of computing resources of the one or more other services communicate with customers via service-to-customer event streams, and wherein the service-to-service event streams are distinct streams from the service-to-customer streams.

8. The system of claim 1, wherein the group-based event analysis service is further configured to:
   generate multi-dimensional vector representations for the events or event flows based on the received data, wherein:
      the received data comprises information for determining a plurality of attributes corresponding to the events or event-flows of the respective one or more service-to-service event streams; and
      dimensions, of a multi-dimensional vector space in which the multi-dimensional vector representations are generated, correspond to respective ones of the attributes.

9. A method, comprising:
   obtaining data related to one or more service-to-service event streams;
   designating, based on the received data, groupings of events or event flows within the one or more service-to-service event streams;
   determining a particular service-to-service event stream comprises anomalous activity relative to a particular grouping that includes the particular service-to-service event stream based on the received data; and
   causing one more mitigation actions to be performed in response to determining a presence of the anomalous activity in the particular service-to-service event stream.

10. The method of claim 9, wherein the one or more mitigation actions comprise:
   terminating one or more processes originating the anomalous activity.

11. The method of claim 9, wherein said initiating the one or more mitigation actions is further based on a determination that the anomalous activity is activity that is considered harmful.

12. The method of claim 11, wherein the one or more mitigation actions further comprise issuing an alert message indicating the presence of activity that is considered harmful.

13. The method of claim 9, wherein a probabilistic grouping technique is used to designate groupings of the events or event flows of the one or more service-to-service event streams based on the received data.

14. The method of claim 9, further comprising:
   evaluating the groupings for redesignation in response to determining the particular service-to-service event stream comprises anomalous activity;
   redesignating the groupings of the events or event flows of the one or more service-to-service event streams based on the evaluation of the groupings.

15. The method of claim 9, wherein the service-to-service event streams comprise communications between:
   a first set of computing resources of a first service of a service provider network;
   a second set of computing resources of a second service of the service provider; and
   wherein the first set of computing resources and the second set of computing resources share a common code base.

16. One or more non-transitory computer-readable media storing program instructions that, when executed on or across one or more processors, cause the one or more processors to:
   obtain data related to one or more service-to-service event streams;

designate, based on the received data, groupings of events or event flows of the one or more service-to-service event streams; and determine a particular service-to-service event stream comprises anomalous activity relative to a particular grouping that includes the particular service-to-service event stream based on the received data.

17. The one or more non-transitory computer-readable media of claim 16, wherein the program instructions, when executed on or across the one or more processors, further cause the one or more processors to:

initiate one or more mitigation actions based on the determination that the particular service-to-service event stream comprises anomalous activity, wherein the one or more mitigation actions comprise terminating one or more processes originating events included in the particular service-to-service event stream.

18. The one or more non-transitory computer-readable media of claim 16, wherein to designate the groupings, the program instructions, when executed on or across the one or more processors, cause the one or more processors to:

determine attributes for the one or more service-to-service event streams; and designate the groupings based on statistical similarities between the attributes for the one or more service-to-service event streams.

19. The one or more non-transitory computer-readable media of claim 16, wherein the program instructions, when executed on or across the one or more processors, further cause the one or more processors to:

generate a multi-dimensional vector, wherein:

the received data related to the plurality of service-to-service event streams comprises a plurality of attributes of the particular service-to-service event stream; and an attribute of the plurality of attributes corresponds to a dimension of the multi-dimensional vector.

20. The one or more non-transitory computer-readable media of claim 16, wherein the program instructions, when executed on or across the one or more processors, further cause the one or more processors to:

redesignate groupings of the events or event flows of the one or more service-to-service event streams based on additionally received data, wherein the program instructions determine, based on the additionally received data, that a given service-to-service event stream comprises anomalous activity relative to a given grouping that includes the given service-to-service event stream.

\* \* \* \* \*